United States Patent [19]
Ho

[11] Patent Number: 6,121,710
[45] Date of Patent: Sep. 19, 2000

[54] STATOR STRUCTURE FOR INDUSTRIAL COOLING FANS

[76] Inventor: Jsewen Ho, P.O. Box 82-144, Taipei, Taiwan

[21] Appl. No.: 09/178,554

[22] Filed: Oct. 26, 1998

[51] Int. Cl.[7] .............................. H02K 1/12; H02K 7/14
[52] U.S. Cl. ................................ 310/254; 310/40 MM; 310/67 R; 310/91
[58] Field of Search .............................. 310/42, 43, 67 R, 310/91, 254, 258, 259, 216, 217, 40 MM, 63; 29/596, 598

[56] References Cited

U.S. PATENT DOCUMENTS

| | | | |
|---|---|---|---|
| 4,987,331 | 1/1991 | Horng | 310/254 |
| 5,093,599 | 3/1992 | Horng | 310/254 |
| 5,245,236 | 9/1993 | Horng | 310/67 R |
| 5,485,044 | 1/1996 | Mackay et al. | 310/90 |

Primary Examiner—Nestor Ramirez
Assistant Examiner—Tran N Nguyen
Attorney, Agent, or Firm—A & J

[57] ABSTRACT

An improved stator structure for industrial cooling fans includes silicon steel plates punched directly into shape to allow direct magnetic conductance so as to enhance field intensity. Upper and lower silicon steel plates are passed through plastic insulating packing pieces and inserted into recessed grooves of a plastic sleeve. The assembly is then riveted in tight fit to achieve a motor stator structure.

3 Claims, 5 Drawing Sheets

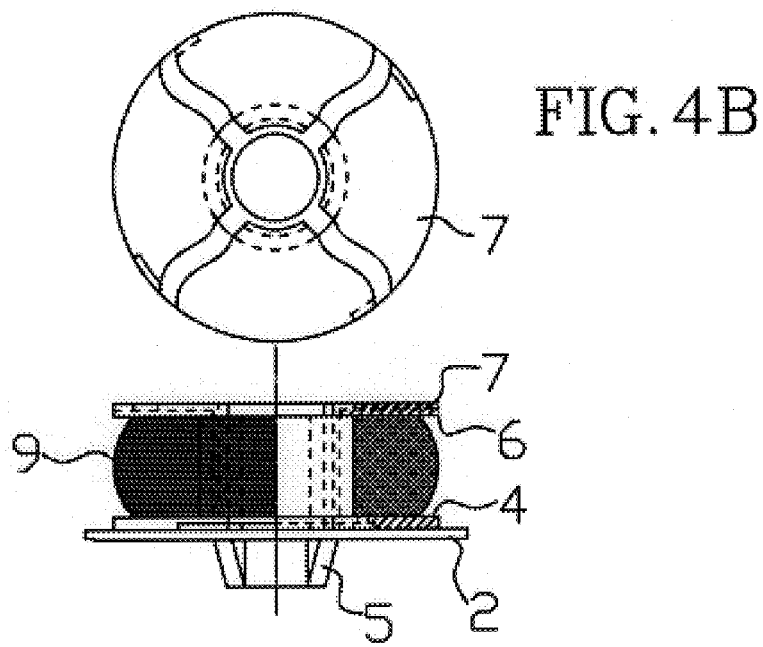
FIG. 4B
FIG. 4A
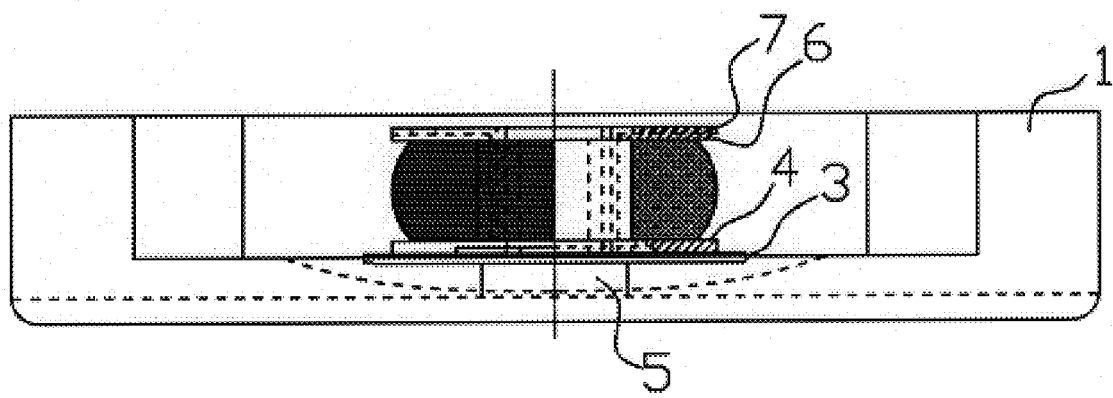
FIG. 5

STATOR STRUCTURE FOR INDUSTRIAL COOLING FANS

BACKGROUND OF THE INVENTION

1. Field of the Invention

The present invention relates to a structure, and more particularly to an improved stator structure for industrial cooling fans to effectively reduce cost and save material.

2. Description of the Prior Art

In addition to using cooling fins, integrated circuit boards generally utilize heat-dissipating motors to dissipate the heat generated thereby. Since heat dissipating motors work for long hours, the heat resistance and stability of the motor stator are very important.

FIG. 1 shows a conventional structure, in which single upper and lower silicon steel plates are used. In assembly, they are coupled to a metal tube 1'; therefore, the magnetic conductance is lost and heat is readily generated.

SUMMARY OF THE INVENTION

The present invention relates to a structure, and more particularly to an improved stator structure for industrial cooling fans to effectively reduce cost and save material.

A primary object of the present invention is to provide a more compact structure to reduce magnetic loss and obtain a larger magnetic field strength while reducing the heat effectively.

Another object of the present invention is to provide an improved stator structure for industrial cooling fan, whereby use of metal material can be reduced so as to lower cost, and a machine plate and a housing seat are utilized for purposes of positioning and fit.

A further object of the present invention is to provide an improved stator structure to adapt to a fan motor requiring higher voltages or higher electric currents or higher rotational speed.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 4A is a sectional schematic view of the present invention;

FIG. 4B is a top view of the present invention;

FIG. 5 is a sectional view showing coupling of the present invention and a housing seat;

DETAILED DESCRIPTION OF THE PREFERRED EMBODIMENT

Figure 1:
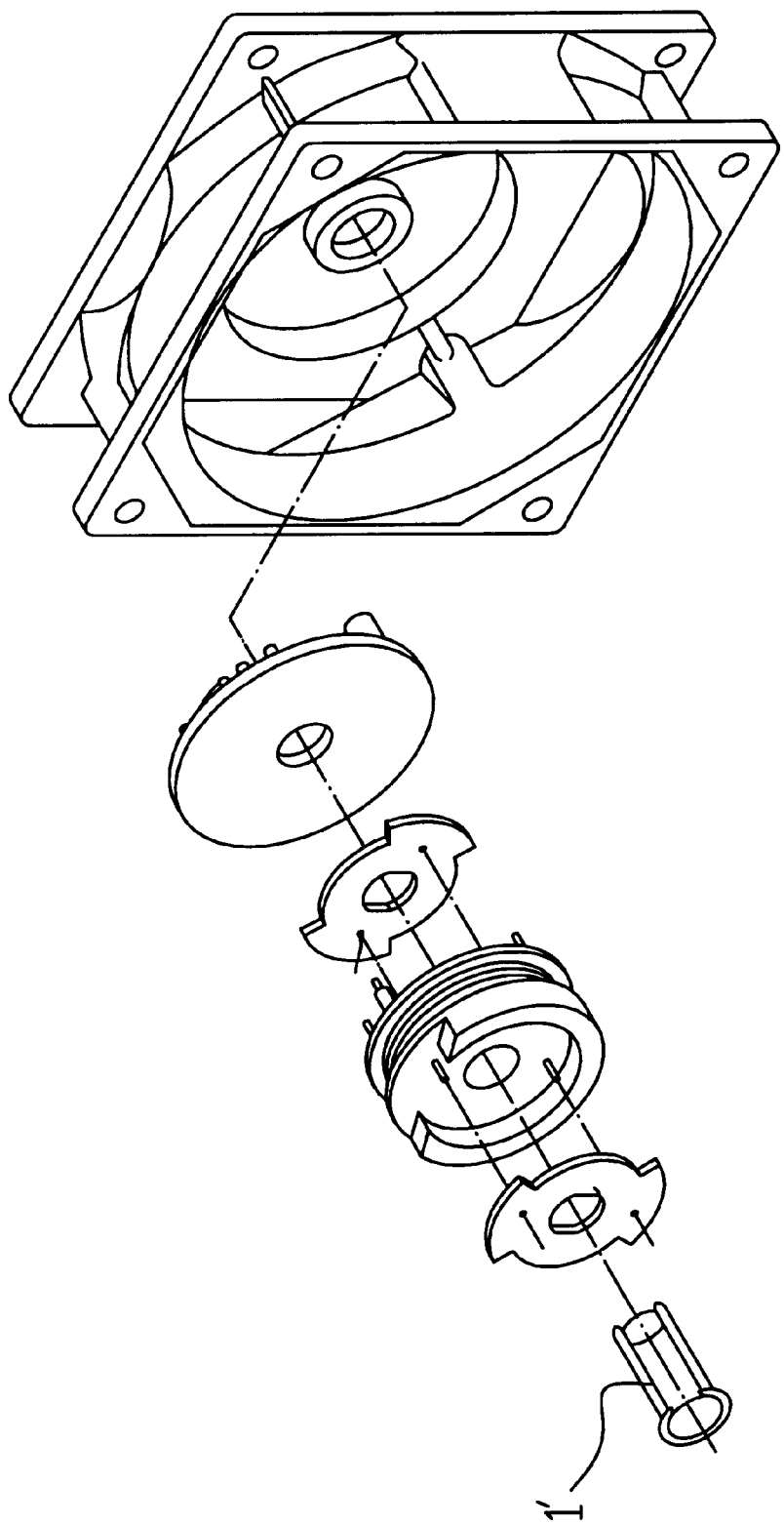
FIG. 1 is a perspective assembled view of the structure of a conventional motor stator.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
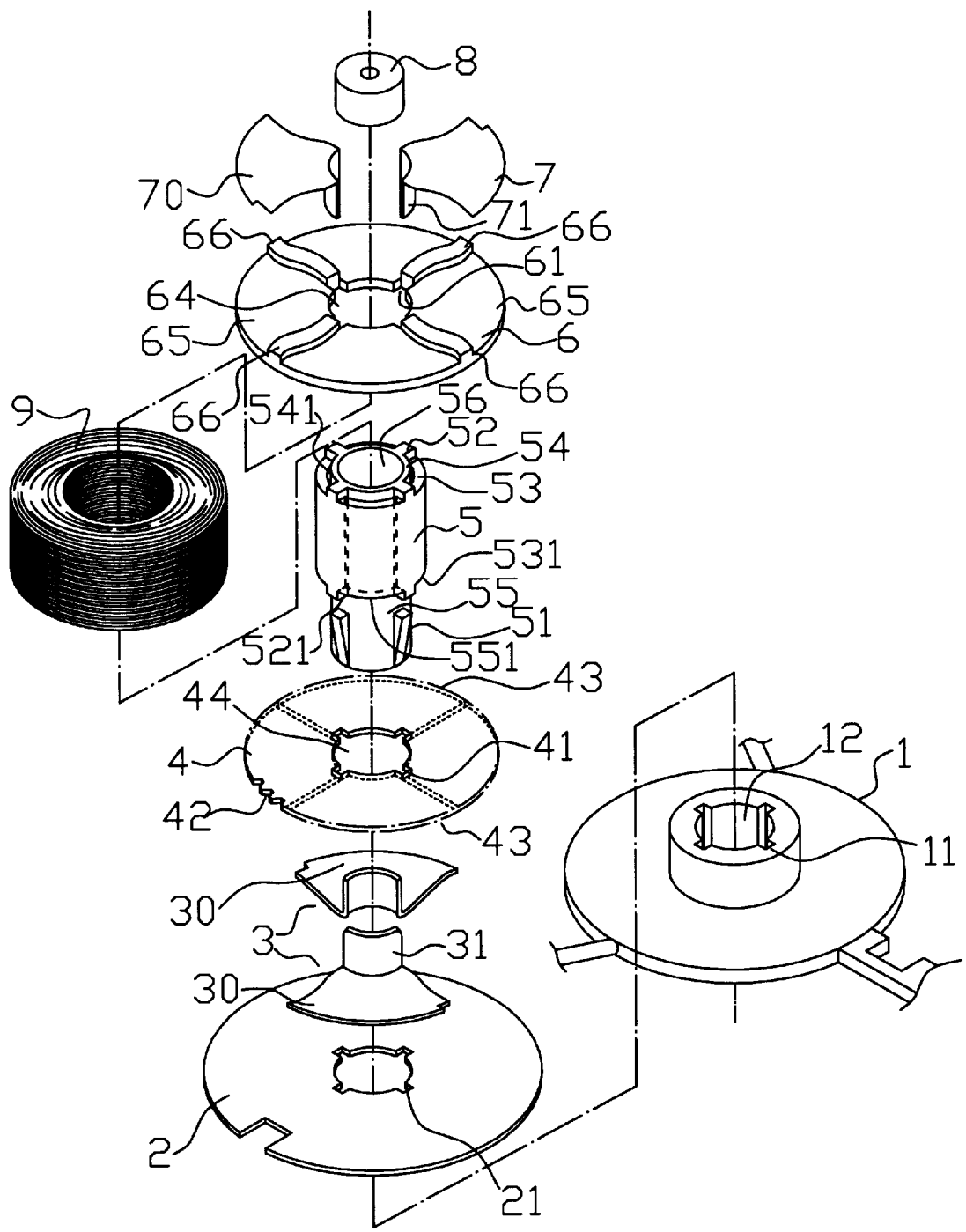
FIG. 2 is a perspective assembled view of the present invention.

The present invention is directed to an improved stator structure for industrial cooling fans as shown in FIG. 2. Upper and lower silicon steel plates 7, 3 are directly punches into shape and are respectively passed through insulating packing pieces 6, 4 made of plastic material to insert into grooves of a plastic sleeve 5 to be positioned. Then the assembly is riveted in tight fit to form a motor stator structure. The plastic sleeve 5 is further passed through a machine plate 2 into a housing seat 1 to be secured therein. A coil is thenwound around the plastic sleeve 5.

The plastic sleeve 5 is a short cylindrical shaft having an upper end provided with a small section of stepped shaft portion 54 with four projections 52. A lower portion of the sleeve 5 is provided with a longer section of stepped shaft portion 55. At a shoulder between the large and small shaft portions, there are likewise provided four projections 521. In addition, insert slots 541, 551 are provided on two shoulders 53, 531. Four wedge-shaped retaining portions 51 are disposed on a rear end of the stepped shaft portion 55.

Upper and lower insulating packing pieces 6, 4 are thin circular plates, which are each divided into four blades by four positioning ribs 66, 46, in which two opposing portions are recessed to form relatively low positioning platforms 65, 43. The packing pieces 4, 6 are respectively provided with a central through hole 44, 64. Four notches 41, 61 are equidistantly spaced around the through holes 44, 64. The outer periphery of the lower insulating packing piece 4 is provided with three small notches 42.

Upper and lower silicon plates 7, 3 have the same shape as the recessed positioning platforms of the upper and lower insulating packing pieces 6, 4. Outer peripheries thereof are provided with shaft pieces 71, 31 of a small curvature.

The machine plate 2 is a circular plate having a central hole that has four notches 21 at its periphery.

The housing seat 1 has a projecting shaft seat with an internal hole that is provided with four notches 11.

Figure 3B:
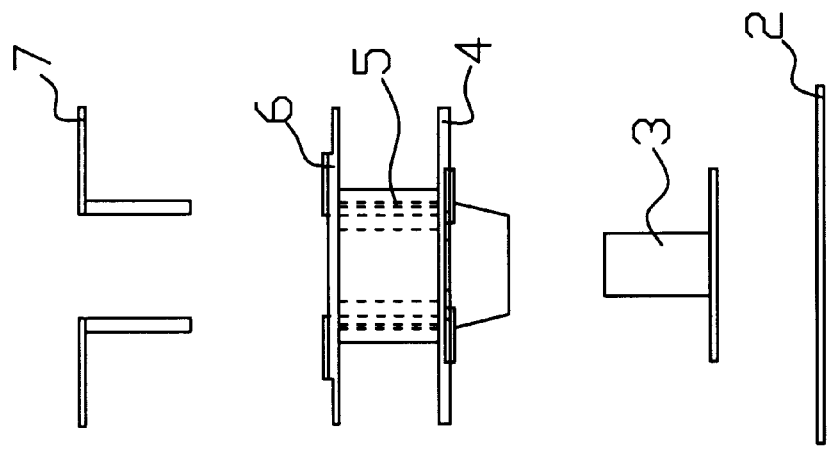
FIG. 3B is a schematic view showing assembly of upper and lower silicon steel plates.
Figure 3A:
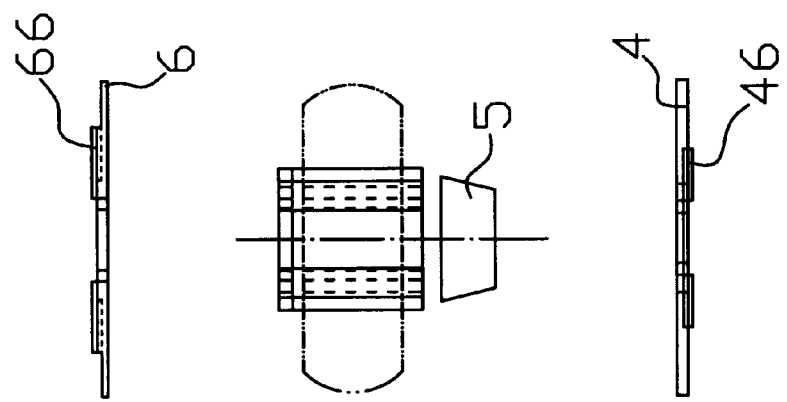
FIG. 3A is a schematic view illustrating assembly of the insulating packing pieces.

Referring to FIGS. 3A, 3B, 4A and 4B, which illustrate assembly of the present invention, upper and lower insulating packing pieces 6, 4 are arranged face-to-face, with their positioning platforms 43, 65 pointing outwardly in alternating positions, as shown in FIG. 3A. They are respectively sleeved into the stepped shaft portions 52, 55 of the plastic sleeve 5. The shoulders 53, 531 formed by the large and small shaft portions can urge against the upper and lower insulating pieces 4, 6, and the projections 52, 521 on the shaft portions can inter-position and match the notches of the upper and lower insulating packing pieces 4, 6. Upper and lower silicon plates 7, 3 have their shaft pieces 71, 31 facing each other in an alternating manner. Blades 70, 30 of the upper and lower silicon steel plates 7, 3 correspond to the positioning grooves 65, 45 on the upper and lower insulating packing pieces 6, 4. The shaft pieces 71, 31 are inserted into insert slots 541, 551 of the plastic sleeve 5, as shown in FIG. 3B. Therefore, upper and lower silicon steel plates 7, 3 are insertable into positioning platforms 65, 43 of upper and lower insulating packing pieces 6, 4 and can be limited and positioned by positioning ribs 66, 46. The central hole of the machine plate 2 is passed through the stepped shaft portion 55 of the plastic sleeve 5, and the plastic sleeve 5 is inserted into the shaft seat hole 12 of the housing seat. Since the central hole of the machine plate 2 is provided with notches, the retaining portions 51 on the stepped shaft portion 55 can be positioned by the notches of the machine plate 2 in interference fit. In addition, due to their wedge-shape, they can be tightly positioned in the shaft seat hole 12 of the housing seat 1. Copper wire is then used to wind around the three small notches 42, being inlets and outlets of coated wires 9, on the outer periphery of the lower insulating packing piece 4.

In the present invention, since the silicon steel plates 7, 3 are directly punched into shape and are inserted into the plastic sleeve 5 to achieve magnetic conductance directly, the metal tube used in the prior art can be eliminated to save material and lower cost. Besides, since the silicon steel plates 7, 3 can achieve direct magnetic conductance, the field intensity can be enhanced, and the phenomenon in which the coil is damaged by overheat due to magnetic loss caused by coupling of the metal sleeve and the silicon steel plates can be avoided.

Furthermore, in the present invention, the fan motor torque can be increased, the operational voltage range enlarged, and the starting voltage lowered. Therefore, the structure of the present invention does not generate much heat, so that a fan motor requiring a higher voltage or higher electric current or higher rotational speed can be adopted.

Certainly, the phase angles of the upper and lower silicon steel plates 7, 3 vary according to their polarities. For instance, if their polarities are 2, 4, 6, 8, and 12, the phase angles are 180 degrees, 90 degrees, 60 degrees, 45 degrees, and 30 degrees.

Figure 6B:
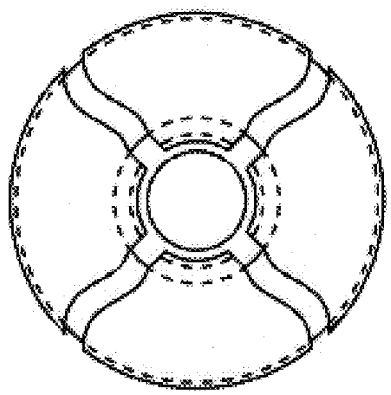
FIG. 6B is a top view of FIG. 6A.
Figure 6A:
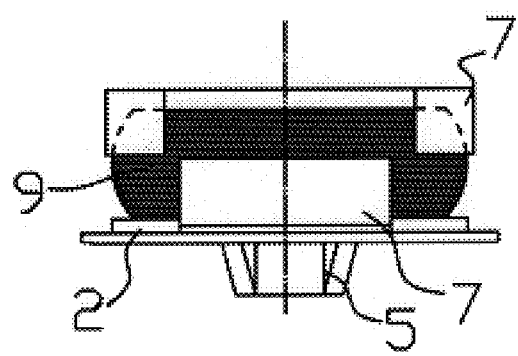
FIG. 6A is a schematic view of another preferred embodiment showing dismantling of wing tails of upper and lower silicon steel plates.

The ends of the blades 70, 30 of the silicon steel plates 7, 3 may also be bent inwardly about 90 degrees (as shown in FIGS. 6A and 6B) to enhance the field excitation area.

In addition, the entire structure of the present invention, including the plastic sleeve 5 and the insulating packing pieces 6, 4 may be formed into individual units in advance before the silicon steel plates 7, 3 are positioned. Alternatively, the silicon steel plates 7, 3 are positioned before integral plastic injection molding, so as to save material and assembly work hours.

Figure 7:
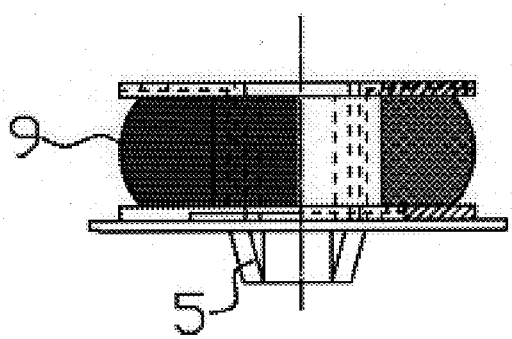
FIG. 7 is a schematic view of a further preferred embodiment in which the sleeve and the packing pieces are integrally formed.

FIG. 4A is a sectional schematic view of the present invention. FIG. 4B is a top view of the present invention. FIG. 5 is a sectional view showing coupling of the present invention and a housing seat. FIG. 6A is a schematic view of another preferred embodiment showing dismantling of wing tails of upper and lower silicon steel plates. FIG. 6B is a top view of FIG. 6A. FIG. 7 is a schematic view of a further preferred embodiment in which the sleeve and the packing pieces are integrally formed.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A stator structure for industrial cooling fans, comprising silicon steel plates that are directly punches into shape and passed through insulating packing pieces and inserted into recessed grooves of a plastic sleeve to be positioned therein, the assembly being riveted in tight fit to achieve a motor stator structure, said plastic sleeve being further passed through a machine plate into a housing seat to be secured therein, with a coil wound around the external periphery of said plastic sleeve, wherein:

said plastic sleeve is plastic injection molded integrally and includes more than one projection and recessed groove, said projection is for guiding and positioning said insulating pieces, said machine plate and said housing seat, said recessed groove is for positioning said silicon steel plates inserted therein in tight fit; and said plastic sleeve further includes an additional projection on a lower portion thereof having an annular recessed portion which, after passing of said sleeve through said machine plate, forms a retaining portion to fit said plate tightly; said insulating pieces each being a circular thin plate having a central hole with positioning notches, said insulating pieces each having four equidistantly spaced positioning ribs forming positioning platforms on an upper face thereof;

said silicon steel plates each including two blades that match the shape of said positioning platforms of said insulating packing pieces, and a sleeve portion.

2. The stator structure for industrial cooling fans as claimed in claim 1, wherein the outer peripheries of said blades of said silicon steel plates are bent inwardly about 90 degrees.

3. The stator structure for industrial cooling fans as claimed in claim 1, wherein said plastic sleeve and said insulating packing pieces are integrally plastic injection molded.

* * * * *